3,065,233
PREPARATION OF CYANURIC ACID
Thomas R. Hopkins, Johnson County, and William C. Francis, Overland Park, Kans., assignors to Spencer Chemical Company, Kansas City, Mo., a corporation of Missouri
No Drawing. Filed Nov. 24, 1959, Ser. No. 855,029
8 Claims. (Cl. 260—248)

This invention relates to cyanuric acid and more particularly, to an improved process for preparing cyanuric acid from urea and/or intermediate urea condensation products.

Cyanuric acid, a trimer of cyanic acid, can be prepared by heating urea to an elevated temperature, as represented by the equation:

$$3NH_2CONH_2 \rightarrow (HNCO)_3 + 3NH_3$$

It is particularly useful as an intermediate for the production of trichlorocyanuric acid, an active component of dry bleach compositions.

Prior processes disclosed for preparing cyanuric acid from urea include the fusion of urea in the presence of inorganic salts such as zinc chloride or ammonium chloride as well as in concentrated sulfuric acid and certain organic solvents such as substituted benzenes, substituted phenols, paraffins and N-substituted acyl amides. However, many of these processes are not entirely satisfactory due to handling and isolation problems, and often result in low yields or impure products.

There is provided by this invention an improved process for preparing cyanuric acid of high purity and in high yields from urea and/or intermediate urea condensation products. It has been found that by heating urea and/or urea condensation products in alkyl sulfones at elevated temperatures there results a conversion to cyanuric acid in high yields and at relatively short reaction times. It also has been found that the cyanuric acid obtained from the reaction mixture can be further treated with a mineral acid to give excellent recovery of a product analyzing nearly 100% cyanuric acid.

For the sake of brevity, the term urea is used hereinafter, although it is to be understood that the intermediate urea condensation products such as biuret, triuret, etc., also are suitable as starting materials for producing cyanuric acid by the process of this invention.

The alkyl sulfones suitable for use in this invention may be represented by the formula

wherein $R_1$ and $R_2$ are alkyl groups or groups formed by combining $R_1$ and $R_2$ to form a cyclic sulfone in which the sulfur atom is part of the ring. Advisably, $R_1$ and $R_2$ are lower alkyl groups such as methyl, ethyl, propyl, isopropyl, butyl and pentyl. An example of a suitable cyclic sulfone represented by combining $R_1$ and $R_2$ is tetramethylenesulfone. The alkyl sulfones of this invention boil at temperatures above 200° C., are substantially inert to the cyanuric acid, are solvents for the urea and do not dissolve an appreciable amount of cyanuric acid at normal temperatures such as room temperature. The alkyl sulfones have the additional advantage of being miscible with water, further facilitating isolation of the water-insoluble cyanuric acid. They are relatively non-corrosive and do not tend to foam at elevated temperatures. These properties as well as many others make them excellent reaction media for converting urea to cyanuric acid.

In order to carry out the process of this invention a solution of urea and an alkyl sulfone is heated to an elevated reaction temperature. Evolution of ammonia begins almost immediately and continues until the reaction is substantially completed. The cyanuric acid can be isolated by conventional procedures such as by filtration or distillation of the sulfone. The recovered sulfone is then suitable for recycle for preparation of additional cyanuric acid.

The sulfone solution of urea is heated to a temperature range of about 175–250° C. and preferably in the range of about 200–250° C. Since some of the alkyl sulfones have a boiling point within this temperature range, close control of the reaction temperature is readily maintained by refluxing the solution.

The progress of the reaction is easily followed by the evolution of ammonia from the reaction mixture. The rate of reaction is somewhat dependent upon the temperature to which the solution is heated, but generally, about 1–8 hours is sufficient to convert substantially all of the urea to cyanuric acid. Preferably, the heating is stopped when the evolution of ammonia has substantially ceased.

The amount of sulfone used is not critical, although it should be sufficient to dissolve the urea and provide efficient heat transfer throughout the solution. Generally, about 1–3 parts by weight of sulfone for each part of urea is suitable, although greater or lesser amounts may be used advantageously under certain conditions.

The insoluble, crystalline cyanuric acid is separated from the reaction medium by conventional procedures, such as by filtration or by tripping off the sulfone. In one method for isolating the cyanuric acid, the reaction mixture is cooled to a temperature slightly above the crystallization point of the sulfone and filtered to separate the crystalline cyanuric acid. Alternatively, the reaction mixture is cooled and diluted with water and the precipitated cyanuric acid is isolated in nearly quantitative yields by filtration at about room temperature or slightly higher temperatures. The aqueous sulfone filtrate is distilled under reduced pressure to remove the water and recover the sulfone which can then be recycled for preparation of additional cyanuric acid.

The cyanuric acid can also be isolated by distilling the reaction mixture under reduced pressure to remove the sulfone and leave a residue of crude cyanuric acid. The residue is washed with solvents such as acetone and water, removing any unreacted urea and other impurities, to give high yields of cyanuric acid of purity as high as about 94%. The distilled sulfone can be recycled for preparation of additional cyanuric acid.

In a preferred embodiment of this invention, the cyanuric acid obtained by stripping off the sulfone or by filtration is subjected to a subsequent treatment with a mineral acid by heating a dispersion of the cyanuric acid in the mineral acid to an elevated temperature thereby hydrolyzing most of the impurities to give a nearly theoretical recovery of 99–100% pure cyanuric acid. The purification procedure is advisably effected by heating the cyanuric acid dispersed in an excess of concentrated or dilute mineral acid at a temperature of about 80–120° C. A reaction time of about 1–20 hours is usually sufficient. Suitable mineral acids include sulfuric acid, hydrochloric acid, phosphoric acid and nitric acid. Generally it is preferred to use a dilute acid, such as about 5–20% aqueous acid since the recovery of product is higher than when concentrated acids are utilized although concentrated acid may also be used. Since the cyanuric acid is insoluble in the mineral acid, the purified product is recovered by filtration at about room temperature. After washing with water and drying, the purified product analyzes 99–100% cyanuric acid and requires no further purification. The acid filtrate can be recycled for purification of additional cyanuric acid.

The following examples illustrate but are not intended to limit the process of the present invention.

Example 1

A stirred solution of urea (30 g.; 0.5 mole) and dimethyl sulfone (60 g.) was heated at 195–200° C. for 6 hours. A precipitate was observed during the third hour of reaction and by the end of the fifth hour there was no further evidence of ammonia evolution. The sulfone was removed by distillation under reduced pressure (water aspirator) and the resulting residue was washed with about 200 ml. of acetone and about 50 ml. of water to give crude cyanuric acid which weighed 17.8 g. and assayed for a purity of 84.1%.

A mixture of 10 g. of the cyanuric acid and 100 ml. of 19% aqueous nitric acid was refluxed for 24 hours. The mixture was cooled to room temperature and filtered to remove the insoluble cyanuric acid. After washing with water and air-drying, the recovered cyanuric acid weighed 9.4 g. (94% recovery) and assayed for a purity of 99.93%.

Example 2

A stirred solution of urea (30 g.; 0.5 mole) and dimethyl sulfone (60 g.) was heated at reflux temperature (247° C.) for 5 hours. The reaction mixture was then cooled to 180° C., and the sulfone was removed by distillation under reduced pressure (water aspirator). The resulting residue was washed with acetone and water to give a yield of 20.2 g. (93%) of product which assayed for a purity of 90.3% cyanuric acid.

A mixture of 9 g. of the cyanuric acid and 50 ml. of 5% aqueous nitric acid was refluxed for 24 hours, cooled to room temperature and filtered. The crystalline cyanuric acid was washed with water and air-dried to give 8.8 g. (97.8% recovery) of product which assayed 99.6% cyanuric acid.

Example 3

A sample of 9 g. of crude cyanuric acid obtained from Example 2 (90.3% purity) was refluxed in 50 ml. of 5% aqueous sulfuric acid for 24 hours. The reaction mixture was cooled and filtered to remove the insoluble, crystalline cyanuric acid which was washed with water and air-dried to give 8.85 g. (98% recovery) of cyanuric acid which assayed for a purity of 99.7%.

Example 4

The procedure of Example 1 was followed except that the solution of urea and dimethyl sulfone was heated for 6 hours at a temperature of 175–180° C. Removal of the sulfone by distillation gave a residue which after washing with acetone and water weighed 13.7 g. and assayed 44% cyanuric acid.

Example 5

A stirred solution of urea (30 g.; 0.5 mole) and diisopropyl sulfone (60 g.) was heated at a temperature of about 200° C. for 6 hours. The reaction mixture was then cooled and filtered, isolating the crystalline cyanuric acid. The crystalline product was washed with acetone and water to give 19.6 g. of crude cyanuric acid (90% yield).

Example 6

A stirred solution of 30 g. (0.5 mole) of urea and 60 g. of di-n-butyl sulfone was heated at about 200° C. for 4 hours. The reaction mixture was cooled to about 35° C. and filtered, isolating the crude cyanuric acid which, after washing with water, then with acetone and dried, weighed 15.5 g. (72% yield).

Example 7

A stirred solution of urea (630 g.; 10.5 moles) and dimethyl sulfone (630 g.) was heated at 210–219° C. for 7 hours. The mixture was cooled to about 100° C., and 1380 ml. of water was added with stirring. The slurry was filtered at 55° C. and the insoluble crystalline product washed with acetone to give 381 g. (84.5% yield) of cyanuric acid which assayed for a purity of 79%.

The aqueous filtrate was distilled under reduced pressure to remove the water and give 550 g. (87.2% recovery) of dimethyl sulfone.

A sample of the crude cyanuric acid (374.3 g.) was refluxed for 28 hours with about 1500 ml. of 5% aqueous nitric acid. The crystalline product was removed by filtration at room temperature, washed with water and dried to give 358 g. (96% recovery) of product which assayed 99.23% cyanuric acid.

Example 8

A stirred solution of urea (30 g.; 0.5 mole) and dimethyl sulfone (60 g.) was heated at reflux for 3 hours. The reaction mixture was cooled to about 100° C. and the sulfone removed by distillation under reduced pressure (water aspirator) to give 58.3 g. (97.2% recovery) of dimethyl sulfone. The resulting residue was washed with 100 ml. of acetone and 50 ml. of water to give 19.9 g. of cyanuric acid (92% yield) which assayed for a purity of 93.61%.

Example 9

A stirred solution of urea (180 g.; 3 moles) in dimethyl sulfone (180 g.) was heated at reflux (247–252° C.) for 2.5 hours. The mixture was cooled to about 180° C., and the sulfone removed by distillation under reduced pressure (water aspirator). The resulting residue was washed with acetone and water to give 119 g. (92.5%) of cyanuric acid which assayed for a purity of 81.8%.

The crude product was refluxed for 26.5 hours in 200 ml. of 5% aqueous nitric acid. The insoluble, crystalline cyanuric acid was removed by filtration and washed with water to give a 97.5% recovery of cyanuric acid which assayed for a purity of 98.1%.

Example 10

A stirred solution of urea (30 g.; 0.5 mole) and 60 g. of tetramethylenesulfone was heated at 208–215° C. for six hours. The reaction mixture was cooled to 30° C. and filtered, isolating the insoluble product. The crystalline product was washed with 30 ml. of water and then air-dried to give 18.6 g. (86.5% of theory) of cyanuric acid which assayed for a purity of 90.8%.

Example 11

A sample of 10 g. of crude cyanuric acid (85.6% purity) was refluxed for 24 hours in 100 ml. of 5% aqueous phosphoric acid. Filtration of the cooled reaction mixture to isolate the crystalline product which was washed with water and air-dried gave 9.5 g. of cyanuric acid (95% recovery) at a purity of 99.74%.

Example 12

A mixture of 10 g. of biuret and 20 g. of tetramethylenesulfone was stirred and heated to 205° C. The biuret dissolved in the sulfone at about 190° C. The solution was stirred at 205–210° C. for six hours. The reaction mixture was cooled to about 30° C. and filtered to remove the crystalline product. The product was washed with 20 ml. of water and with a small amount of diethyl ether, then dried in a vacuum desiccator to give 6.5 g. of cyanuric acid.

Example 13

A sample of 10 g. of crude cyanuric acid (82.04% purity) was refluxed for 24 hours in 50 ml. of 5% aqueous hydrochloric acid. Filtration and washing with water gave 9.7 g. of cyanuric acid (97% recovery) at a purity of 99.01%.

Example 14

A sample of 10 g. of crude cyanuric acid (83.2% pure) was refluxed for 3 hours in 50 ml. of concentrated nitric acid (69.5% $HNO_3$). Work-up by the procedure of Example 11 gave an 84% recovery of cyanuric acid at a purity of 99.55%.

Example 15

A sample of 10 g. of crude cyanuric acid (83.2% pure) was heated at 100–110° C. in 50 ml. of concentrated sulfuric acid. Work-up by the procedure of Example 11 gave a 79% recovery of cyanuric acid at a purity of 97.98%.

Example 16

A sample of 10 g. of crude cyanuric acid (83.2% pure) was refluxed in 50 ml. of 5% aqueous nitric acid for 1 hour. Recovery of the product by the procedure of Example 11 gave an 87.5% recovery of cyanuric acid which assayed for a purity of 97.42%.

Various changes and modifications of the invention can be made and to the extent that such variations incorporate the spirit of this invention, they are intended to be included within the scope of the appended claims.

What is claimed is:

1. In a process for preparing cyanuric acid by heating a compound selected from the group consisting of urea and intermediate urea condensation products in an organic solvent medium at an elevated temperature of at least 175° C. for a reaction period sufficient to produce a substantial amount of cyanuric acid and recovering said cyanuric acid, the improvement comprising the employment as said organic solvent medium a lower alkyl sulfone having the formula

wherein $R_1$ and $R_2$ are members of the group consisting of lower alkyl and groups represented by combining said $R_1$ and $R_2$ lower alkyl groups to form a cyclic lower alkyl sulfone in which the sulfur atom is part of the ring.

2. The process of claim 1 in which said lower alkyl sulfone is dimethyl sulfone.

3. The process of claim 1 in which said lower alkyl sulfone is dipropyl sulfone.

4. The process of claim 1 in which said lower alkyl sulfone is tetramethylene sulfone.

5. The process of claim 1 in which said compound is heated at a temperature of about 200–250° C.

6. In a process for preparing cyanuric acid by heating urea in an organic solvent medium at a temperature of about 200 to 250° C. until the evolution of ammonia substantially ceases, the improvement which comprises employing as said organic solvent medium a lower alkyl sulfone having the formula

wherein $R_1$ and $R_2$ are members of the group consisting of lower alkyl and groups represented by combining said $R_1$ and $R_2$ lower alkyl groups to form a cyclic lower alkyl sulfone in which the sulfur atom is part of the ring.

7. The process of claim 6 in which said lower alkyl sulfone is dimethyl sulfone.

8. The process of claim 6 in which said lower alkyl sulfone is tetramethylene sulfone.

References Cited in the file of this patent

UNITED STATES PATENTS

| | | |
|---|---|---|
| 2,404,717 | Houtz | July 23, 1946 |
| 2,768,167 | Marzluff et al. | Oct. 23, 1956 |
| 2,811,497 | Ham | Oct. 29, 1957 |
| 2,870,163 | Davis et al. | Jan. 20, 1959 |
| 2,872,447 | Oehlschlaeger | Feb. 3, 1959 |
| 2,943,088 | Westfall | June 28, 1960 |
| 2,952,679 | Perret | Sept. 13, 1960 |

FOREIGN PATENTS

| | | |
|---|---|---|
| 506,070 | Canada | Sept. 28, 1954 |
| 578,398 | Canada | June 23, 1959 |

OTHER REFERENCES

Liebig: Annalen der Chemie, vol. 95, pp. 264–265 (1855).

Lange's Handbook of Chemistry, 9th Ed., pages 502–3, 520–1, Handbook Publishers, Inc., Sandusky, Ohio (1956).

Chem. and Eng. News, page 3933, September 19, 1955.

Beilstein: vol. 1, 4th Ed., EIII, pages 1217–18, system #19, Springer Verlag, Berlin (1958).